US 12,079,454 B1

(12) United States Patent
Briscoe et al.

(10) Patent No.: US 12,079,454 B1
(45) Date of Patent: Sep. 3, 2024

(54) WEIGHTED SCROLL FOR DISPLAY OF HIERARCHICAL STRUCTURES

(71) Applicant: ADOBE INC., San Jose, CA (US)

(72) Inventors: Matthew Briscoe, Provo, UT (US); Peter Alexander Ciszak, San Francisco, CA (US); Kittisak Sirijaroonchai, San Francisco, CA (US); Grant Steven Russell, Pleasant Grove, UT (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/124,304

(22) Filed: Mar. 21, 2023

Related U.S. Application Data (60) Provisional application No. 63/401,552, filed on Aug. 26, 2022.

(51) Int. Cl.
*G06F 3/0481* (2022.01)
*G06F 3/0483* (2013.01)
*G06F 3/0485* (2022.01)

(52) U.S. Cl.
CPC .......... *G06F 3/0483* (2013.01); *G06F 3/0481* (2013.01); *G06F 3/0485* (2013.01)

(58) Field of Classification Search
None
See application file for complete search history.

(56) References Cited

U.S. PATENT DOCUMENTS

| 7,003,525 | B1* | 2/2006 | Horvitz | H04L 67/52 707/999.102 |
| 11,003,839 | B1* | 5/2021 | Hatch | G06F 40/166 |
| 2013/0102287 | A1* | 4/2013 | Toksvig | H04W 4/90 455/414.1 |
| 2014/0050094 | A1* | 2/2014 | Branch | H04L 47/215 370/235.1 |
| 2022/0310047 | A1* | 9/2022 | Klapuri | G10H 1/0016 |

OTHER PUBLICATIONS

Sreyasee et al., "Multi-view Knowledge Graph for Explainable Course Content Recommendation in Course Discussion Posts" 2022 26th International Conference on Pattern Recognition (ICPR) Aug. 21-25, 2022, Montréal, Québec, Canada, copyright 2022 IEEE, pp. 2785-2791. (Year: 2022).*

* cited by examiner

*Primary Examiner* — Amelia L Tapp
(74) *Attorney, Agent, or Firm* — Shook, Hardy & Bacon L.L.P.

(57) ABSTRACT

In various examples, a first dataset including a first set of nodes maintained in a hierarchical data structure is obtained and displayed in a user interface. Urgency scores are then determined for a subset of nodes of the set of nodes displayed in the user interface, the urgency score indicating that the portion of the first dataset displayed in the user interface is within a distance to an end of the first data set, and based on the urgency score being above a threshold, causing a request for a second dataset including a second set of nodes maintained in the hierarchical data structure to be generated.

20 Claims, 7 Drawing Sheets

WEIGHTED SCROLL FOR DISPLAY OF HIERARCHICAL STRUCTURES

CROSS-REFERENCE TO RELATED APPLICATIONS

This application claims the benefit of U.S. Provisional Application No. 63/401,552, filed on Aug. 8, 2022. The contents of each of which are hereby incorporated by reference in their entirety.

BACKGROUND

In distributed computing environments, including computing resource service providers, various users, services, and computing resources are in frequent communication with each other over various networks. As such, data can be distributed between various entities, maintained on behalf of various users, or otherwise distributed between computing resources. For example, users can store data in a hierarchical data structure maintained within one or more remote data stores provided by a computing resource service provider. The complexity and distribution of computing resources in these environments make it difficult to respond to user requests without some delay.

SUMMARY

Embodiments described herein are directed to systems and methods for retrieving data maintained and/or stored in a hierarchical data structure from one or more computing resources based on a user's interactions and/or behavior. When retrieving hierarchical data (e.g., data stored in folders or other tree structures) for display in a user interface, solutions typically fetch data as needed which can cause delays and impact the customer experience. For example, these methods obtain data in batches (e.g., 50 data objects) but have no way of predicting what data (e.g., folders or subfolders) the user could be interested in and/or interact with.

As such, in various embodiments, the systems and methods described are directed towards analyzing user activity and predicting data objects a user could navigate to, interact with, or otherwise be interested in, allowing for the preloading of data including the predicted data objects. In one example, a snapshot of the user interface is captured periodically (e.g., 150 ms) and an urgency score is calculated for the nodes displayed in the user interface. As the user navigates the user interface, the scores can be dynamically updated. Once the user is within a certain proximity of the end of the data set (e.g., the lowest node displayed is halfway from the end of the data set), the urgency scores are evaluated to determine if a threshold is met and, if the threshold is met, additional data is obtained. In one example, for a batch of 50 folders, once the user navigates to folder 25, the urgency scores for the folders displayed are compared to the threshold and, once the threshold is satisfied (e.g., the urgency score for a particular folder exceeds the threshold of a particular folder depth), additional data is loaded and buffered until displayed in the user interface.

The urgency score can be incremented for each data object displayed in the user interface. Other methods for determining the urgency score can also be used; for example, the urgency score can be determined based on a percentage of the data objects not displayed in the user interface remaining in memory of the application. Furthermore, the user interface can be displayed in an application executed by a client device that communicates with one or more remote servers of a computing resource service provider. In addition, the threshold can be dynamically adjusted based on various factors such as node depth, network latency, scrolling speed, expansion state of the data (e.g., a number of folders and/or subfolders displayed in the user interface), or other factors that can influence a rate at which the user will access additional data.

The systems and methods described are capable of preloading data based on user activity and thereby can eliminate load times for users associated with obtaining additional data (e.g., data object) for display in the user interface. In addition, other systems simply request additional data once a buffer is empty leading to load times and other delays for the user. Furthermore, in various embodiments, the systems and methods prevent unnecessary transactions by only loading data the user is likely to use (e.g., data at a particular depth). Lastly, data can be retrieved and stored in a buffer until needed allowing the user to freely navigate the user interface without experiencing load times or other delays.

BRIEF DESCRIPTION OF THE DRAWINGS

The present invention is described in detail below with reference to the attached drawing figures, wherein.

DETAILED DESCRIPTION

Embodiments described herein generally relate to a user interface or other component of an application that retrieves data maintained and/or stored in a hierarchical data structure from one or more computing resources based on user interactions and/or behavior. In accordance with some aspects, the systems and methods described are directed to monitoring user activity and analyzing the user activity to predict data objects that a user could navigate to, interact with, or otherwise be interested in. These predictions, in various embodiments, allow the application to preload data including data objects the user is predicted to navigate to, interact with, or otherwise be interested in. In one example, a snapshot of the user interface is captured periodically (e.g., 150 ms) and an urgency score is calculated for the nodes displayed in the user interface, this urgency score is then used to determine whether to fetch or otherwise preload additional data objects. Furthermore, in various embodiments, the data objects are organized and/or stored in a hierarchical data structure. In one example, the data objects are stored in nodes of a tree structure. In another example, the data objects are stored in folders and/or subfolders.

In various embodiments, as the user navigates the user interface (e.g., scrolls up or down, expands nodes, selects data objects, etc.), urgency scores for various nodes are dynamically updated. For example, the urgency scores for the data objects are determined based on a relative distance to the last data object stored in memory (e.g., buffer). In various embodiment, the first data object in memory (e.g., in a batch of data objects obtained from the server) is assigned a value (e.g., zero) and the value is incremented for additional data objects (e.g., the value one is assigned to the second data object, the value two is assigned to the third data object . . . ). In such embodiments, when a value assigned to a data object displayed in the user interface meets and/or exceeds a threshold (e.g., twenty-six) additional data objects are requested from the sever and stored in memory for display in the user interface should the user cause the data objects to be displayed.

In addition, in other embodiments, the urgency scores for various nodes are summed or otherwise combined and, when the sum of the urgency scores exceeds a threshold value, additional data objects are obtained. For example, when the sum of the urgency scores for all of the nodes (e.g., folders and/or subfolders) displayed in the user interface exceeds the threshold value, the application obtains additional nodes for one or more remote servers. In addition, in various embodiments, when the urgency score exceeds the threshold, the application evaluates additional factors (e.g., scroll speed, scroll direction, user interface size, network latency, etc.) to determine whether to obtain additional data objects.

Other solutions typically fetch data as needed when retrieving data for display in a user interface. However, this can cause delays and impact the customer experience. For example, when data is obtained in batches as a result of an end of a buffer being reached, the users can experience delays while data is obtained and loaded. Furthermore, these solutions do not include any means for predicting what data (e.g., folders and/or subfolders) the user could be interested in and/or interact with. In networked solutions, users often scroll to the end of the buffered data faster than the solutions can retrieve data leading to delays, load times, and overall customer frustration. The systems and methods described in the present disclosure address at least some of these issues by monitoring user activity, generating predictions based on user activity, and pre-fetching data.

As such, in various embodiments, a user device (e.g., personal computer, mobile device, tablet, laptop etc.) obtains hierarchical data (e.g., data objects stored in a hierarchical data structure such as a tree) for display in a user interface of an application. In one example, the application includes a web browser with a user interface to display data objects to the user and allow the user to interact with the data objects. In various embodiments, the application obtains a batch of hierarchical data (e.g., data objects, folders, subfolders, metadata, etc.) and displays a portion of the hierarchical data in the user interface, the portion of the hierarchical data displayed can be monitored by the application or other component. In addition, in such embodiments, as the user navigates the user interface, the application or other component tracks the portion of the hierarchical data currently being displayed. For example, the application, at various intervals, samples the user interface to determine the hierarchical data that is displayed in the user interface.

In various embodiments, the application or other component analyzes the hierarchical data that is displayed in the user interface and determines a score based on various factors such as proximity to the end of the buffered data (e.g., urgency), node depth, node state, and/or other attributes of the hierarchical data displayed in the user interface. Furthermore, in some embodiments, various other factors can be included when determining the score such as scrolling speed, scrolling direction, size of the display, number of data objects displayed, or other attributes of the user interface. For example, the offset (e.g., an offset x from the end of the list of data objects stored in memory of the application) is reduced as the node depth (e.g., the depth of a hierarchical data structure such as a tree) increase. In an embodiment, the offset scaled in relation to the node depth. In other embodiments, values are subtracted from the offset as the node depth increased. Furthermore, as mentioned above additional parameters (e.g., current network latency, screen size, and/or scroll direction) can be used to modify the offset and/or determine whether to obtain additional data objects, in various embodiment. For example, if a scrolling velocity exceeds a threshold, the application prevents additional data objects from being obtained.

In various embodiments, an urgency score is calculated for each data object (e.g., folder, subfolder, file, image, thumbnail, etc.) displayed in the user interface based on the data object's distance relative to the last data object maintained by the application (e.g., in a display buffer or other memory). Furthermore, in such embodiments, the urgency scores for each data object displayed in the user interface is evaluated and, as a result of a particular urgency score exceeding a threshold, additional data objects are obtained. In an embodiment, the threshold is dynamically determined based on various factors such as scroll rate, scroll direction, latency, buffer size, or other factors. For example, if the user is scrolling at a high rate, the threshold can be lowered or the urgency scores can be increased. In an embodiment, when the threshold is exceeded, an additional batch of data objects are obtained from a data store or other location. Furthermore, in various embodiments, when the additional batch of data objects are obtained as a result of the urgency scores exceeding the threshold, the data objects can be maintained in memory (e.g., buffered) until the user interface is updated and the data objects are to be displayed (e.g., the user navigates to a location in the user interface where the data objects are displayed).

Aspects of the technology described herein provide a number of improvements over existing technologies. For instance, the technology described herein is capable of preloading data based on user activity and, as a result, can eliminate load times for users. For example, by obtaining additional data objects for display in a user interface prior to the user interacting with those data objects. In addition, the systems and methods can prevent unnecessary operations (e.g., data requests) based on monitoring user activity. Lastly, once data is retrieved, it can be stored in a buffer until needed, further reducing load times and other delays as the user navigates the user interface.

Figure 1:
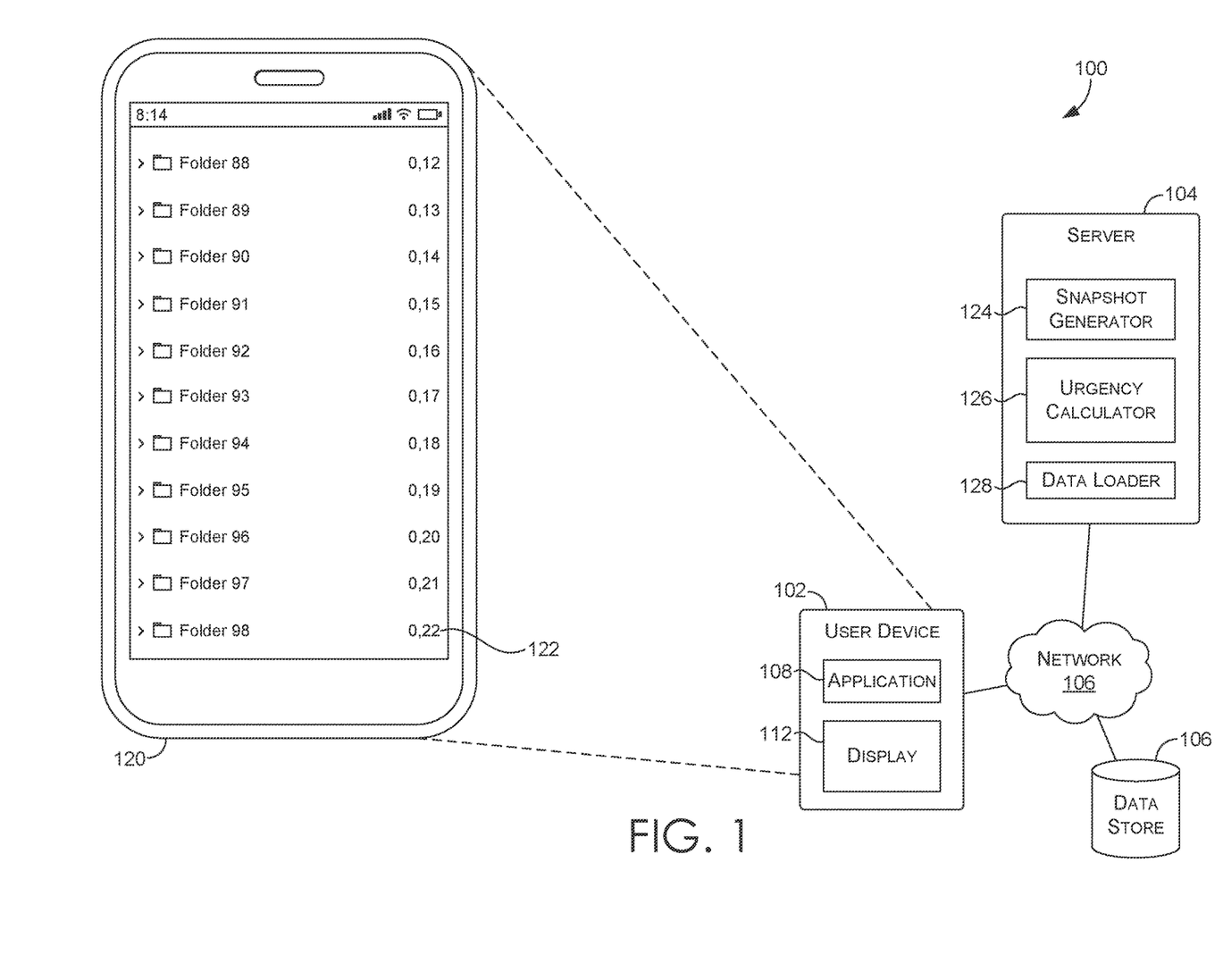
FIG. 1 depicts a diagram of an environment in which one or more embodiments of the present disclosure can be practiced.

Turning to FIG. 1, FIG. 1 is a diagram of an operating environment 100 in which one or more embodiments of the present disclosure can be practiced. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether for the sake of clarity. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, some functions can be carried out by a processor executing instructions stored in memory as further described with reference to FIG. 7.

It should be understood that operating environment 100 shown in FIG. 1 is an example of one suitable operating environment. Among other components not shown, operating environment 100 includes a user device 102, a server 104, and a network 106. Each of the components shown in FIG. 1 can be implemented via any type of computing device, such as one or more computing devices 700 described in connection with FIG. 7, for example. These components communicate with each other via network 106, which can be wired, wireless, or both. Network 106 can include multiple networks, or a network of networks, but is shown in simple form so as not to obscure aspects of the present disclosure. By way of example, network 106 can include one or more wide area networks (WANs), one or more local area networks (LANs), one or more public networks such as the Internet, and/or one or more private networks. Where network 106 includes a wireless telecommunications network, components such as a base station, a communications tower, or even access points (as well as other components) provide wireless connectivity. Networking environments are commonplace in offices, enterprise-wide computer networks, intranets, and the Internet. Accordingly, network 106 is not described in significant detail.

It should be understood that any number of devices, servers, and other components can be employed within operating environment 100 within the scope of the present disclosure. Each can comprise a single device or multiple devices cooperating in a distributed environment. For example, the server 104 includes multiple server computer systems cooperating in a distributed environment to perform the operations described in the present disclosure.

User device 102 can be any type of computing device capable of being operated by an entity (e.g., individual or organization) and obtains data from the server 104 and/or a data store 106 which, in some embodiments, is facilitated by the server 104 (e.g., the server 104 operating as a frontend for the data store 106.). The user device 102, in various embodiments, has access to or otherwise maintains data in a hierarchical data structure (e.g., the documents, images, videos, folders, subfolders, data objects, assets etc.) in the data store 106.

In some implementations, user device 102 is the type of computing device described in connection with FIG. 7. By way of example and not limitation, a user device 102 can be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user device 102 can include one or more processors, and one or more computer-readable media. The computer-readable media can include computer-readable instructions executable by the one or more processors. The instructions can be embodied by one or more applications, such as application 108 shown in FIG. 1. Application 108 is referred to as a single application for simplicity, but its functionality can be embodied by one or more applications in practice.

The application(s) 108, in various embodiments, generally include any application capable of facilitating the exchange of information between the user device 102 and the server 104 in obtaining data objects (e.g., from the data store 106) for display in a user interface 120 of the application 108. In some implementations, the application 108 comprises a web application, which can run in a web browser, and can be hosted at least partially on the server-side of the operating environment 100. In addition, or instead, the application 108 can comprise a dedicated application, such as an application being supported by the user device 102 and the server 104. In some cases, the application 108 is integrated into the operating system (e.g., as a service). It is therefore contemplated herein that "application" be interpreted broadly. Some example applications include ADOBE® SIGN, a cloud-based e-signature service, and ADOBE ACROBAT®, which allows users to view, create, manipulate, print, and manage documents.

For cloud-based implementations, the application 108 can be utilized to interface with the functionality implemented by the server 104. In some embodiments, the components, or portions thereof, of server 104 are implemented on the user device 102 or other systems or devices. Thus, it should be appreciated that the server 104 can be provided via multiple devices arranged in a distributed environment that collectively provide the functionality described herein. Additionally, other components not shown can also be included within the distributed environment.

As illustrated in FIG. 1, the server 104 includes a snapshot generator 124, an urgency calculator 126, and a data loader 128. In one example, the snapshot generator 124 determines a set of data objects displayed in the user interface 120 of the application. Furthermore, in various embodiments, the snapshot generator 124 determines additional information associated with the application 108 and/or user interface 120 such as an expansion state of various data objects, a number of data objects maintained in memory of the application 108, or other information to determine whether to load additional data objects. In one example, the snapshot generator 124 obtains data from a document object model (DOM) associated with the application 108. As described in greater detail below, in various embodiments, the urgency calculator 126 determines and/or assigns urgency scores to data objects. In addition, in an embodiment, the data loader 128 obtains data objects from the data store 106 and provides the data objects to the user device 102. Although the snapshot generator 124, the urgency calculator 126, and the data loader 128 are shown in FIG. 1 as executed by the server 104, one or more of these components can be executed by the user device 102 in an embodiment.

In various embodiments, the determination to load additional data objects is made at least by measuring a variety of data points (e.g., obtained from the application 108) to determine whether to obtain additional data objects (e.g., from a hierarchical data structure maintained in the data store 106. In an example, the application 108 includes the DOM which indicates a subset of a full list of data objects maintained by the application 108, where the subset of data objects are displayed in the user interface 120 of the application 108 (e.g., the application 108 has stored in memory a thousand data objects but only twenty are included in the DOM the viewable area of the user interface 120). Furthermore, in this example, the determination whether to obtain additional data objects is based on the subset of data objects displayed in the user interface 120.

In various embodiments, the urgency calculator 126 determines tree nodes in the DOM (e.g., data objects displayed in the user interface 120) and assigns an urgency score 122, with a floored gradient that increases near the end of the list of data objects stored in memory of the application 108, with the last currently loaded data object having the highest urgency score and with the urgency scores decreasing by an offset x from the end of the list of data objects stored in memory of the application 108. For example, as illustrated in FIG. 1, the last data object displayed "Folder 98" is assigned an urgency score 122 of "0, 22" based on a distance (e.g., number of data objects) from the end of the list of data objects stored in memory of the application 108, where the urgency scores decrease the further the data object is from the end of the list of data objects stored in memory of the application 108. Furthermore, in various embodiments, the offset is modified based on the depth of the data object.

In various embodiments, the end of the list of data objects stored in memory of the application 108 is the last data object in a batch of data objects obtained from the data store 106 for display in the user interface 120 of the application 108. In one example, the batch of data objects includes fifty data objects and the offset is twenty-five and, as such, once the data objects displayed in the user interface 120 are within twenty-five data objects to the end of the batch of data objects, the urgency calculator 126 or other component determines a set of urgency scores for the data objects displayed in the user interface 120.

In various embodiments, data objects further than a particular distance (e.g., further than the offset) from the end of the list of data objects stored in memory of the application 108 are assigned an urgency score of zero or otherwise not factored when determining to load additional data objects (e.g., by the urgency calculator 126). Furthermore, in some embodiments, as users navigate the user interface 120 data objects are dynamically loaded into the user interface 120 and the urgency score, the offsets, and/or gradients are recalculated for the data objects displayed (e.g., the nodes in the tree of the DOM). Furthermore, in embodiments where the data objects displayed include at least one folder and/or subfolder, the folder and/or subfolder must be expanded for the data objects within the folder and/or subfolder to be assigned an urgency score.

In an embodiment, as the user scrolls (via mouse scroll, or accessibility features such as keyboard or other means) the user interface 120, urgency scores (e.g., urgency scores for tree nodes of the DOM) are determined and/or assigned. In one example, as the user scrolls and new data objects are displayed in the user interface 120 the urgency score is incremented and assigned to the new data object displayed in the user interface 120. In various embodiments, if the a particular urgency score associated with a particular data object displayed in the user interface 120 exceeds a threshold associated with the depth of the particular data object, the application 108 and/or urgency calculator 126 determines to load additional data objects. For example, a threshold for a first depth (e.g., root node or depth zero) is set to twenty and a threshold for a second depth (e.g., a child node or depth one) is set to seven. In this example, if the urgency score for a data object at the second depth exceeds seven the application 108 and/or urgency calculator 126 loads additional data objects.

In other embodiments, as the user scrolls (via mouse scroll, or accessibility features such as keyboard or other means) the user interface 120, a sum of the urgency scores (e.g., urgency scores for tree nodes of the DOM) are determined and compared to a previous sum of the urgency scores. In one example, if the sum of the urgency scores is decreasing, the application 108 and/or urgency calculator 126 determines not to load additional data objects (e.g., the user is scrolling away from the area of potential expansion). In another example, if the sum of the urgency scores is increasing, the application 108 and/or urgency calculator 126 determines if the sum exceeds a threshold to determine whether to load additional data objects. In an embodiment, if the threshold is exceeded, the application 108 and/or data loader 128 requests a new batch of data objects from the server 104 and/or the data store 106.

In various embodiments, the urgency scores are maintained per data object (e.g., a tree node included in the DOM) such that multiple data objects can be evaluated at adjacent or varied depths in the display of the user interface (e.g., the current view displayed to the user). For example, by checking or otherwise monitoring previous urgency scores, the rate of change over time can be evaluated to determine whether the user is likely to attempt to discover additional children (e.g., subfolders) per data object, or if the user is simply scrolling past the data object. In such an example, using the rate of change to determine whether to obtain additional data objects prevents the expansion for areas (e.g., folders and subfolders) that are not of interest to the user.

In addition, in some embodiments, a depth value associated with the data objects is used during calculation and/or evaluation of the urgency scores to determine whether to load additional data objects. In one example, the depth value associated with a particular data object corresponds to a location of the particular data object within the hierarchical data structure. In embodiments where the hierarchical data structure includes a tree (e.g., folders and subfolders), the root node is assigned a first value (e.g., zero) and the first value is incremented as the depth of the tree increases (e.g., children, children of children, etc.). As illustrated in FIG. 1, "Folder 98" is at the depth of the root node and has a depth value of zero shown as "0, 22" where "0" indicates the depth and "22" indicates the urgency score associated with the data object.

In various embodiments, data objects with a lower depth value (e.g., shallower location in the hierarchical data structure) are evaluated using a lower threshold for the urgency scores of the data objects at the same depth (e.g., having the same depth value). Alternatively, in such embodiments, data objects with a higher depth value (e.g., deeper location in the hierarchical data structure) are evaluated using a higher threshold for the urgency scores of the data objects at the same depth.

In various embodiments, the urgency scores are evaluated (e.g., summed, individually compared to a threshold, partially combined, provided as inputs to an algorithm, or otherwise evaluated based on the threshold) at a particular depth of the hierarchical data structure and various depths are evaluated individually. In one example, the urgency calculator 126, when determining if one or more thresholds for requesting additional data have been met, determines if a data object at a folder level (e.g., "Folder 98") is assigned an urgency score that exceeds the threshold associated with the folder level. In another example, the urgency calculator 126, when determining if one or more thresholds for requesting additional data have been met, sums urgency scores for data objects at a folder level (e.g., "Folder 98") and compares the sum to a first threshold associated with the folder level and sums urgency scores for data objects at a subfolder level and compares the sum to a second threshold associated with the subfolder level. As described in greater detail below in connection with FIG. 4, in various embodiments, the second threshold is determined by applying a multiplier associated with the depth to the first threshold. For example, the multiplier at the folder level (e.g., root level and/or depth zero) is one and the multiplier for the subfolder level (e.g., depth one) is one half In other embodiments, a value (e.g., ten) is subtracted from the threshold for each sublevel and/or depth below the folder level (e.g., root).

An example of the urgency calculator 126 is illustrated by the following pusedocode:

```
function extractUrgencyFrom(nodes) {
    const currUrgencyScores = { };
    nodes.forEach(({ dataset: { loadTarget, loadUrgency,
        loadDepth = '0' } })=> {
    const scores = (currUrgencyScores[loadTarget] =
        currUrgencyScores[loadTarget] || { });
    scores.depth = parseInt(loadDepth, 10);
    scores.urgency = (scores.urgency || 0) + parseInt(loadUrgency, 10); });
    return currUrgencyScores;
}
```

In various embodiments, the threshold is dynamically adjusted based on various factors such as screen size associated with the user interface 120, network latency associated with the network 106, processing time associated with the server 104 and/or data store 106, or other factors that influence the rate at which additional hierarchical data can be obtained by the user device 102. In one example, the threshold can be dynamically lowered in situations where the server 104 has dependencies of various computing resources (e.g., the data store 106) that increase an amount of time the server 104 takes to process requests for additional hierarchical data from the user device 102. In another example, the threshold can be dynamically lowered based on network latency associated with the network 106 (e.g., ping).

Furthermore, in some embodiments, the application 108 maintains a static threshold and a dynamic threshold. For example, the static threshold can be used when the user is idle (e.g., not scrolling within the user interface) and the dynamic threshold can be used when the user is navigating the user interface 120 (e.g., scrolling). Furthermore, in such embodiments, the dynamic threshold is modified based on scrolling speed and/or scroll direction. In one example, the dynamic threshold is increased as a result of the user scrolling up (e.g., towards data objects that have been previously rendered). In this example, increasing the dynamic threshold can prevent inadvertent loading of additional hierarchical data (e.g., the user is scrolling away from the location for which additional hierarchical data is to be loaded). In various embodiments, the dynamic threshold prevents loading additional data objects based on scrolling velocity associated with the user interface.

In various embodiments, once the threshold has been meet and/or exceeded, the application 108 transmits a request to the server 104 and/or data store 106 to obtain additional hierarchical data. In an embodiment, the request includes information indicating particular data objects, a depth, a folder, a subfolder, location, or other information indicating the hierarchical data to obtain. For example, the request includes identification information for a particular folder (e.g., the folder associated with the data objects for which the urgency scores exceeded the threshold).

Figure 2:
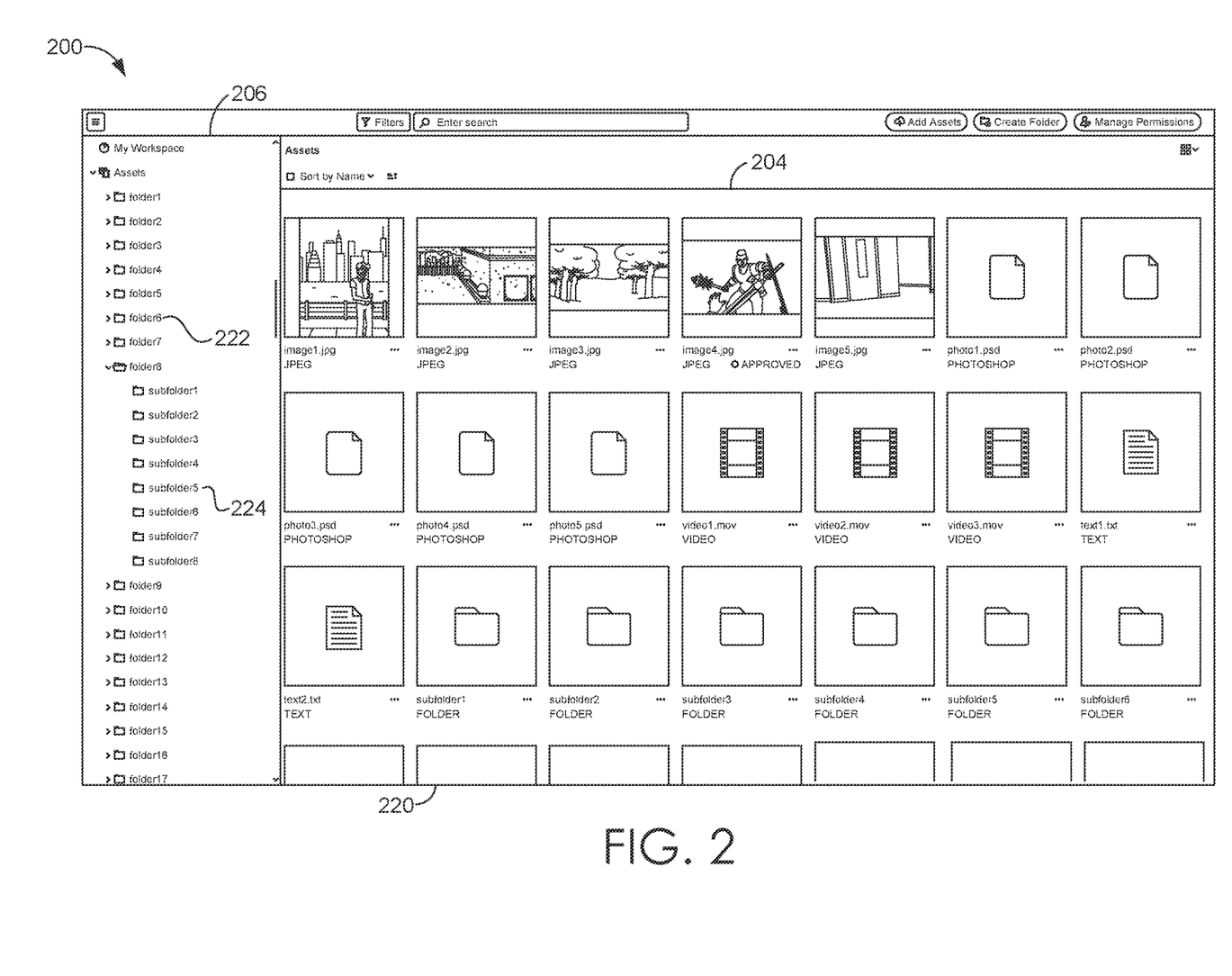
FIG. 2 depicts a diagram of a user interface displaying data objects maintained in a hierarchical data structure, in accordance with at least one embodiment.

FIG. 2 illustrates an environment 200 in which a user interface 220 displays data objects maintained in a hierarchical data structure in accordance with at least one embodiment. In various embodiments, the user interface 220 is rendered or otherwise generated by an application such as the application 108 described above in connection with FIG. 1. Furthermore, in various embodiments, the application or other component (e.g., the server 104 described in greater detail above in connection with FIG. 1) monitors user activity associated with the user interface 220 and predicts and/or determines when to load additional data objects. In the example illustrated in FIG. 2, a collection of data objects are displayed in a display pane 204 of the user interface 220. In various embodiments, the display pane 204 of the user interface 220 renders data objects, previews of data objects, metadata associated with data objects, or otherwise displays information to the user.

In addition, in this example, the collection of data objects is organized in a tree structure (e.g., folders 222 and subfolders 224). In other embodiments, the collection of data objects are maintained in another type of hierarchical data structure. Furthermore, in various embodiments, the folders 222 and subfolders 224 are displayed in a navigation pane 206. The navigation pane 206, for example, allows the user to scroll or otherwise navigate the folders 222 and subfolders 224. In various embodiments, the navigation pane 206 allows the user to navigate the hierarchical data structure to interact with data objects maintained in the hierarchical data structure. Although the user interface 220 illustrated in FIG. 2 includes the display pane 204 and the navigation pane 206, other formats and/or structures of the user interface 220 can be used in various embodiments.

In various embodiments, as the user interacts with the user interface 220, urgency scores for the folders 222 and subfolders 224 are assigned or otherwise determined. For example, "folder8" is assigned a first urgency score, "subfolder1" is assigned a second urgency score, and "folder9" is assigned a third urgency score. In the example illustrated in FIG. 2, the urgency scores are not shown for simplicity. Furthermore, in various embodiments, the urgency scores for the folders 222 and subfolders 224 displayed in the user interface 220 are evaluated to determine if a threshold for loading additional data objects has been satisfied. In one example, the urgency scores are evaluated per level of the hierarchical data structure. In an embodiment, the urgency scores for the folders 222 (e.g., "folder1"-"folder 17") are evaluated individually to determine if the threshold associated with the folders 222 is satisfied. Similarly, in such embodiments, the urgency scores for the subfolders 224 (e.g., "subfolder1"-"subfolder8") are evaluated individually to determine if the threshold associated with the subfolders 224 is satisfied In other embodiments, the urgency scores for the folders 222 (e.g., "folder1"-"folder 17") are summed or otherwise combined and the urgency scores for the subfolders 224 (e.g., "subfolder1"-"subfolder8") are summed or otherwise combined. In various embodiments, each level of the hierarchical data structure (e.g., the folders 222 and the subfolders 224) is evaluated separately to determine whether to load additional data objects. Furthermore, in such embodiments, each level of the hierarchical data structure (e.g., the folders 222 and the subfolders 224) is associated with a distinct threshold.

In various embodiments, as the user scrolls the navigation pane 206, the user interface 220 transmits or otherwise provides the application with an event or other indication. In response to the event or other indication, in an embodiment, the application determines a scroll direction of the user. In one example, if the user is scrolling up (e.g., scrolling back to folders 222 and/or subfolders 224 that have been previously loaded) the application not need to load additional data objects. In another example, if the user is scrolling down (e.g., scrolling to folders 222 and/or subfolders 224 that have not been obtained or otherwise loaded from the hierarchical data structure) the application determines whether to load additional data objects.

In various embodiments, the urgency scores are assigned to the folders 222 and/or subfolders 224 once they are rendered in the user interface 220. In one example, the urgency scores are assigned to nodes in the DOM representing the folders 222 and/or subfolders 224. In this example, the application or other component (e.g., urgency score calculator 126 described above in FIG. 1) obtains the urgency scores from the DOM when determining whether the urgency scores exceeds one or more thresholds. In various embodiments, if one or more threshold is exceeded, that application transmits a request to obtain additional data. For example, the application requests additional data objects associated with the level of the hierarchical data structure (e.g., "subfolder8," "folder8," etc.) for which the sum of the urgency scores exceeded the threshold. In various embodiments, the data objects (e.g., the additional data objects obtained in response to the request) are maintained in a buffer until the user navigates to the data objects as described in greater detail below in connection with FIG. 5.

Figure 3:
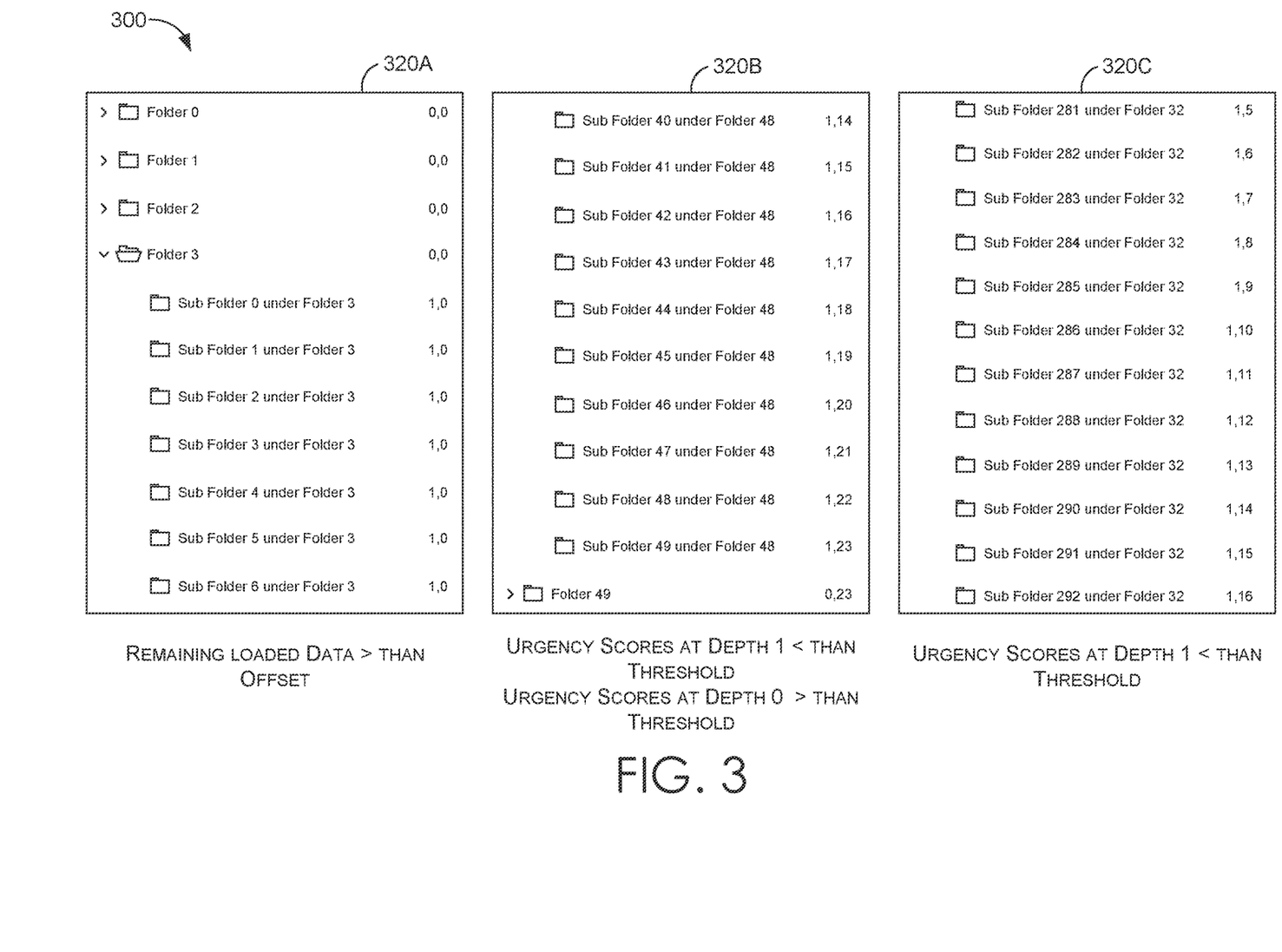
FIG. 3 depicts a diagram of an environment in which a prediction to obtain additional data is generated, in accordance with at least one embodiment.

FIG. 3 illustrates an environment 300 in which urgency scores are evaluated for various user interfaces 320A-C of an application in accordance with at least one embodiment. As described above, in various embodiments, the depth value and urgency score of the data objects (e.g., folders and subfolders) displayed in the user interfaces 320A-C are assigned when the data objects are rendered by the application. For example, "Folder 0" in user interface 320A is assigned a depth value of zero and an urgency score of zero, illustrated as "0, 0" in FIG. 3. In another example, "Sub Folder 40 under Folder 48" in user interface 320B is assigned a depth value of one and an urgency score of 14, illustrated as "1, 14" in FIG. 3.

In an embodiment, the depth value is assigned based on a depth or location of the data object within a hierarchical data structure in which the data objects are maintained. For example, "Sub Folder 281 under Folder 32" is assigned the depth one as a result of "Sub Folder 281" being a subfolder of "Folder 32" which is at depth zero (e.g., the root level of a tree structure). In various embodiments, the depth value is used by the application to determine a multiplier and/or scaling factor to apply to the threshold when determining whether to load additional data objects. Furthermore, in an embodiment, the depth value is used to evaluate urgency scores. In one example, the urgency scores for the data objects at depth one in user interface 320B are evaluated to determine if any of the urgency scores for the data objects satisfies the threshold associated with depth one.

In one example, the urgency scores for the data objects at depth one in user interface 320B are summed to generate a value of 185 and the data objects at depth zero in user interface 320B are summed to generate a value of 23. In this example, each sum of the urgency scores (e.g., 185 for data objects at depth one and 23 for data objects are depth zero) is evaluated and/or compared to a threshold associated with the depth to determine whether to load additional data objects.

In an embodiment, if the criteria for determining whether to load additional data objects is met (e.g., the user is scrolling within the user interface 320B), the urgency calculator, application, or other component obtains urgency scores from the user interface 320B or a component thereof such as the DOM. Furthermore, in various embodiments, the urgency scores are assigned during rending in the user interface (e.g., user interface 320C). For example, when the user interface 320C is rendered by the application, the depths and urgency scores are determined for the data objects displayed in the user interface and stored (e.g., in DOM or other structured data object such as Java Script Object Notation (JSON)). In a particular example, as illustrated in FIG. 3, "Sub Folder 292 under Folder 32" when rendered is assigned a depth of one based on the hierarchical data structure and an urgency score of sixteen based on a relative distance to the last data object stored in memory of the application.

In various embodiments, urgency scores for data objects in the user interface (e.g., 320A) are not assigned until an offset is exceeded and/or the data objects displayed within the user interface are within a relative distance to the last data object stored in memory of the application. In one example, urgency scores are not assigned to a data object until the data objects displayed are halfway to the end of the data objects stored in memory of the application. For example, if the application obtains a batch of fifty data objects, urgency scores are assigned to data objects once the data object displayed is at least twenty-five data objects from the end of the batch of fifty data objects. In various embodiments, the offset is determined based on a number of data objects stored in memory or otherwise accessible to the application without requesting additional data from a server and/or data store. Furthermore, in such embodiments, when rendering the user interface (e.g., user interface 320A), the offset is used to determine whether to assign an urgency score to a particular data object. In one example, urgency scores for the data objects displayed in user interface 320A are not determined as a result of the offset not being satisfied. In yet other embodiments, the offset is not used when determining urgency scores.

In an embodiment, the offset is used to determine when the load additional data. For example, when the offset it exceeded (e.g., the urgency score for a data objects displayed in the user interface 320A exceeds the offset) additional data objects are obtained. Furthermore, in various embodiments, the offset is modified based on the depth of at least one data object displayed in the user interface 320A. For example, the offset can be divided by the node depth or some value determined based on the node depth (e.g., a multiplier of the node depth). As illustrated in FIG. 3A "Sub Folder 6 under Folder 3" is at depth one, in this example, the offset (e.g., 25) is divided by two (e.g., for depth zero and depth one). In other embodiments, the offset can be divided by a number of node depths of the hierarchical data structure. For example, the offset can be divided by five and the result can be distributed such that the offset is reduced for node depth greater than the root node (e.g., depth zero). Therefore, in this example, if the offset is twenty five and divided by five, the result five can be user to reduced the offset at each depth (e.g., twenty for depth one, fifteen for depth two, etc. . . . ) and, as result, data objects closer to the end of the list of data object stored in memory cause the application obtain more data objects.

In various embodiments, the urgency scores are determined by incrementing data objects that satisfy the offset. In one example, the offset is fifty and every data object that is within fifty data objects from an end of a list of data objects stored by the application (e.g., in a buffer) is assigned an urgency score that is incremented (e.g., the value one is added to each successive data object) for every data object that is closer to the end of the list of data objects. As illustrated in FIG. 3, "Sub Folder 40 under Folder 48" is assigned an urgency score of fourteen based on the offset (e.g., "Sub Folder 40 under Folder 48" is fourteen data objects from the offset), this value is incremented by one to determine the urgency score for "Sub Folder 41 under Folder 48" (e.g., fifteen).

Figure 4:
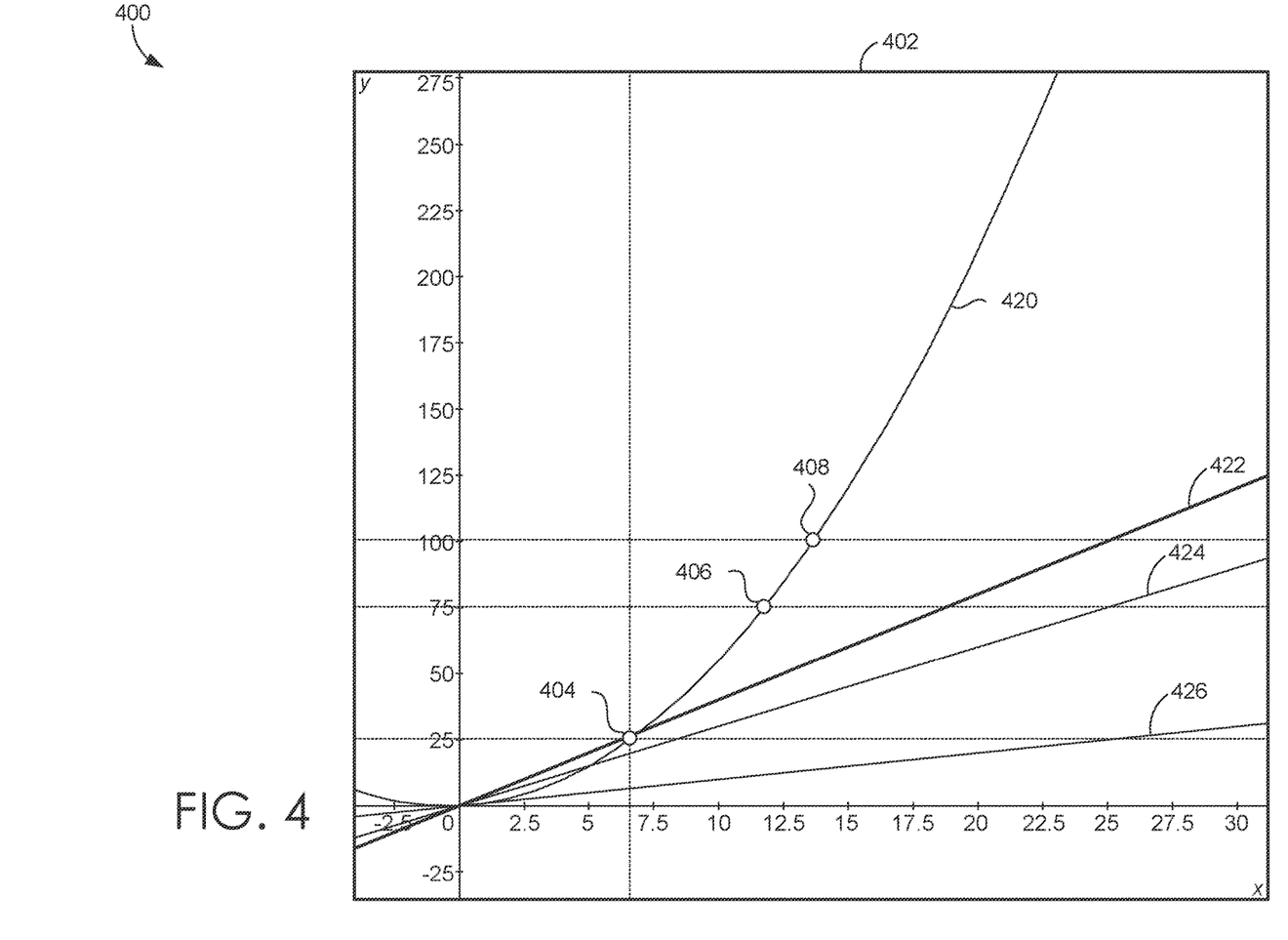
FIG. 4 depicts a diagram of a set of thresholds for loading additional data at various depths of a hierarchical data structure, in accordance with at least one embodiment.

FIG. 4 illustrates an environment 400 in which a graph is used to determine various thresholds for determining whether to load additional data objects in accordance with at least one embodiment. As described above, when determining whether to load additional data objects, in an embodiment, a set of urgency scores associated with data objects (e.g., folders) displayed in a user interface is compared to a threshold, if the threshold is met and/or exceeded, additional data objects are requested. In the embodiment illustrated in FIG. 4, the sum of incrementing integers is represented by a parabola 420, defined by the following equation:

$$y = x\frac{(x+1)}{2}.$$

Furthermore, in an embodiment, in the graph 402, the x-axis represents urgency score values and the y-axis represents the sum of the urgency scores.

In various embodiments, the graph 402 includes several lines representing the threshold values corresponding to particular depths of the hierarchical data structure. For example, as illustrated in FIG. 4, the graph 402 includes a first line 426 associated with a first threshold at a first depth of the hierarchical data structure, a second line 424 associated with a second threshold at a second depth of the hierarchical data structure, and a third line 422 associated with a third threshold at a third depth of the hierarchical data structure. In an embodiment, the first line 426 is represented by the equation y=x, the second line 424 is represented by the equation y=3x, and the third line 422 is represented by the equation y=4x. In such an embodiment, the value three in the equation for the second line 424 represents a multiplier application to the threshold associated with the first depth to obtain the threshold associated with the second depth.

In various embodiments, the thresholds are determined based on the x value of the parabola where the y value associated with the sum of the urgency scores intersects the line associated with the threshold (e.g., the first line 426, the second line 424, and the third line 422). In one example, a first point 404 represents the first threshold determined based on the x value (e.g. approximately six) of the parabola 420 where y is equal to the threshold value (e.g., twenty-five) that is associated with the first depth. Similarly, in other examples, a second point 406 represents the second threshold and a third point 408 represents the third threshold. The first threshold, second threshold, and third threshold described in connection with FIG. 4 are for illustrative purposes and any number of thresholds can be used in accordance with the embodiments described in the present disclosure.

Figure 5:
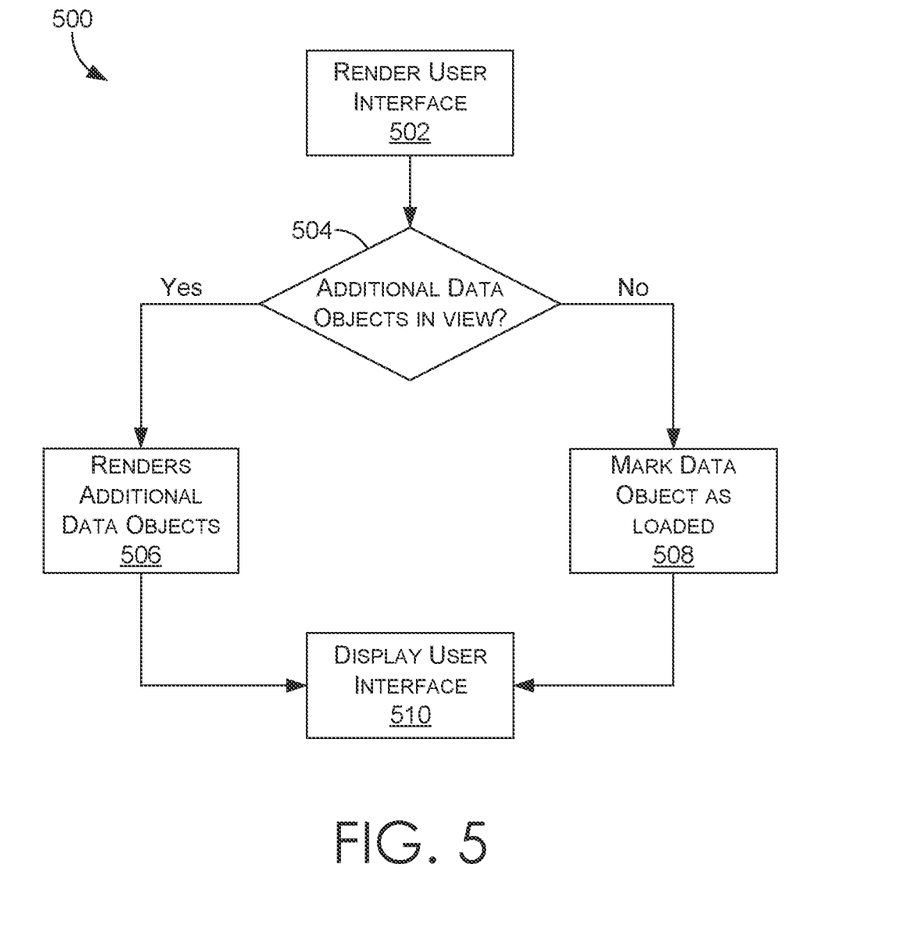
FIG. 5 depicts an example process flow for determining whether to display data in a user interface, in accordance with at least one embodiment.

FIG. 5 is a flow diagram showing a method 500 for determining data objects to render in a user interface in accordance with at least one embodiment. The method 500 can be performed, for instance, by the application 108 of FIG. 1. Each block of the method 500 and any other methods described herein comprise a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 502, the system implementing the method 500 renders the user interface. As described above in connection with FIG. 1, in various embodiments, the application provides a user interface to allow users to interact with data objects maintained in a hierarchical data structure. For example, the application allows the user to interact with assets stored in a tree structure. Furthermore, as described above, the application or other component determines whether to obtain additional data objects for display based on urgency scores associated with the data object in an embodiment.

In various embodiments, the application obtains additional data objects before the user navigates to the user interface to view that corresponding portion of the hierarchical data structure. In one example, as the user scrolls data objects stored in memory of the application, the application or other component determines whether one or more thresholds for requesting additional data objects is satisfied based on urgency scores of the data objects displayed in the user interface. As a result, in such an example, data objects are obtained by the application prior to the user navigating or otherwise causing the application to render the data objects.

At block 504, the system implementing the method 500 determines whether additional data objects are in view within the user interface. In an embodiment, the system determines whether the user has navigated the user interface to a location within the hierarchical data structure associated with the additional data objects. For example, the system determines whether the folders or subfolders obtained (e.g., the additional data objects) are within the display of the application. If the additional data objects are within the user interface, the system implementing the method 500 continues to block 506 and renders the additional data objects. Alternatively, if the additional data objects are not within the user interface, the system implementing the method 500 continues to block 508 and indicates that the data objects are loaded.

In various embodiments, the data objects are loaded in to a buffer or otherwise stored for display later. For example, the data objects can be stored in a buffer and, when the user navigates to the corresponding location, the data objects can be obtained from the buffer and rendered in the user interface. At block 510, the system implementing the method 500 displays the user interface. For example, the application updates the user interface based on the rendered data. In this manner, additional data objects can be obtained based on user activity and a prediction of the data objects the user could navigate to or otherwise interact with and rendered or otherwise stored in memory of the application and displayed as desired by the user in accordance with various embodiments.

Figure 6:
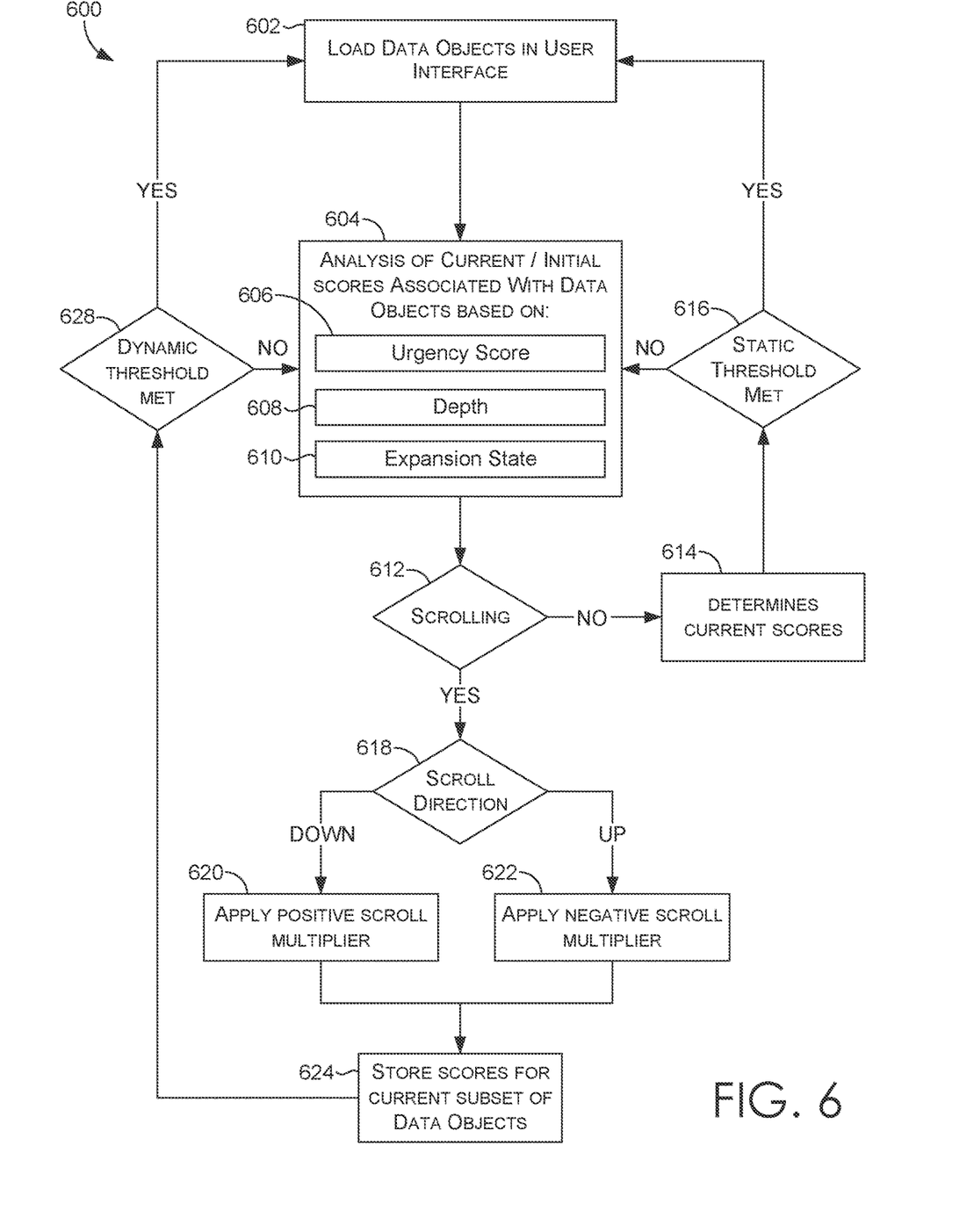
FIG. 6 depicts an example process flow for generating predictions to obtain additional data objects maintained in a hierarchical data structure, in accordance with at least one embodiment.

FIG. 6 is a flow diagram showing a method 600 for determining whether a threshold for loading additional data objects has been satisfied in accordance with an embodiment. The method 600 can be performed, for instance, by the urgency calculator 126 of FIG. 1. As shown at block 602, the system implementing the method 600 loads data objects in a user interface of an application. In one example, the application obtains a batch of data objects (e.g., folders, subfolders, assets, etc.) and loads the data objects in to memory of the application for display in the user interface. In various embodiments, as the user navigates the user interface, data objects from the memory of the application are rendered for display in the user interface.

At block 604, the system implementing the method 600 performs analysis of scores (e.g., urgency scores) and other information associated with the data objects. In various embodiments, block 604 is performed during rendering of the user interface. For example, as data objects are rendered within the user interface an urgency score 606, a depth 608, and an expansion state 610 are evaluated. In various embodiments, the data objects displayed within the user interface (e.g., rendered) are evaluated by at least summing the urgency scores 606 associated with each data object. Furthermore, as described above, the urgency scores 606 are summed based on the depth 608 associated with the data objects in an embodiment. In one example, all data objects at depth one are evaluated together (e.g., the urgency scores are summed). In addition, in various embodiments, unexpanded data objects (e.g., folders or subfolders) are excluded from the analysis. Furthermore, in an embodiment, a result of the analysis (e.g., the urgency scores for a particular depth) is maintained in memory.

At block 612, the system implementing the method 600 determines if the user is scrolling. In various embodiments, if the user scrolls within the user interface, the application generates a trigger. In various embodiments, the system implementing the method 600 waits at block 612 until scrolling is detected. In yet other embodiments, the system implementing the method continues to block 614 if scrolling is not detected. At block 614, the system implementing the method 600 determines the current scores for the data objects displayed in the user interface. In various embodiments, the scores represent the depth and urgency score associated with a particular data object.

At block 616, the system implementing the method 600 determines if a static threshold is met. In an embodiment, the static threshold represents a value which, when the user is static (e.g., not scrolling), is compared to the current scores to determine whether to load and/or request additional data objects. In an embodiment, block 614 and block 616 are omitted and the system implementing the method 600 waits at block 612 for the user to scroll thereby triggering the application to generate an event.

Returning to block 612, if the user is scrolling, the system implementing the method 600 continues to block 618. At block 618, the system implementing the method 600 determines the scroll direction. For example, the application compares the current urgency scores to previously saved urgency scores; if the values are increasing, the user is scrolling down, if the values are decreasing, the user is scrolling up. In another example, the trigger from the application indicates the direction the user is scrolling. If the user is scrolling up, the system implementing the method 600 continues to block 622 and applies a negative scroll multiplier to one or more threshold for determining whether to load additional data objects (e.g., request data objects from a data store in block 602). In various embodiments, the negative scroll multiplier is a value that causes the one or more thresholds to be increased. In other embodiments, the negative scroll multiplier is a value that causes the scores (e.g., urgency scores) to be decreased.

If the user is scrolling down, the system implementing the method 600 continues to block 620 and applies a positive scroll multiplier to one or more threshold for determining whether to load additional data objects (e.g., request data objects from a data store in block 602). In other embodiments, the positive scroll multiplier is a value that causes the scores (e.g., urgency scores) to be increased. In one embodiment, the positive scroll multiplier and/or negative scroll multiplier is determined based at least in part on a rate at which the user is scrolling. In another embodiment, the positive scroll multiplier and/or negative scroll multiplier are fixed (e.g., encoded in the executable code associated with the method 600).

Furthermore, in various embodiments, as the user scrolls, additional data objects are displayed within the user interface and the operations described above in connection with the block 604 are performed for the newly displayed (e.g., rendered) data objects. At block 624, the system implementing the method 600 stores the scores for the current subset of data objects displayed in the user interface. For example, the urgency scores and/or sum of the urgency scores is stored in memory and can be used to determine scrolling direction as described above in connection with block 612.

At block 628, the system implementing the method 600 determines whether one or more dynamic thresholds have been met. In various embodiments, the dynamic thresholds refer to the one or more thresholds based on the user scrolling in the user interface (e.g., as opposed to being static and not scrolling). As described above in connection with FIG. 4, the dynamic thresholds, in one example, are determined based on the x-axis value obtained when the y-axis value is set to the offset. Furthermore, in various embodiments, the dynamic thresholds are each associated with a particular depth. If a threshold is satisfied, the system implementing the method 600 continues to block 602 and loads data objects in the user interface. For example, the application can request additional data objects from a data store.

Figure 7:
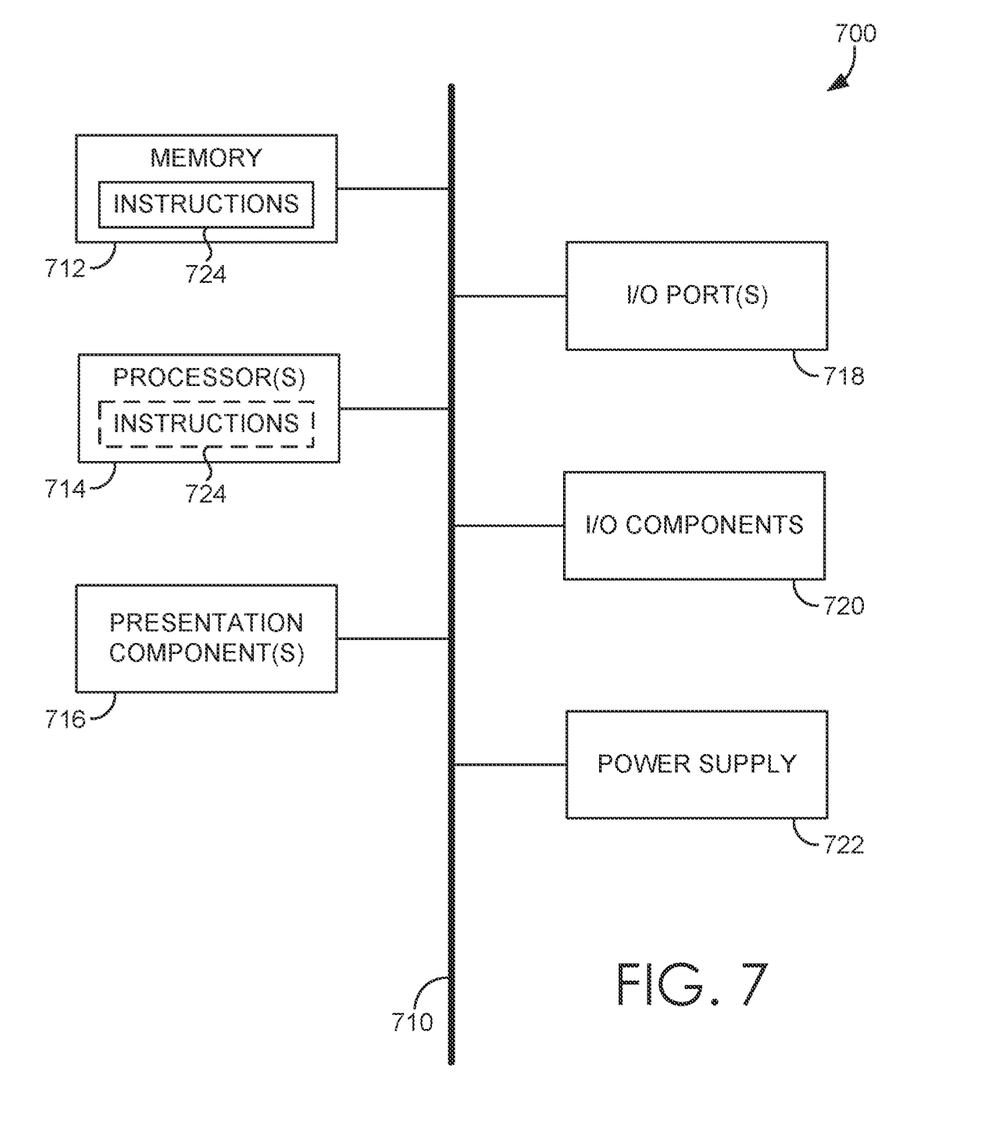
FIG. 7 is a block diagram of an exemplary computing environment suitable for use in implementations of the present disclosure.

Having described embodiments of the present invention, FIG. 7 provides an example of a computing device in which embodiments of the present invention can be employed. Computing device 700 includes bus 710 that directly or indirectly couples the following devices: memory 712, one or more processors 714, one or more presentation components 716, input/output (I/O) ports 718, input/output components 720, and illustrative power supply 722. Bus 710 can include one or more busses (such as an address bus, data bus, or combination thereof). Although the various blocks of FIG. 7 are shown with lines for the sake of clarity, in reality, delineating various components is not so clear, and metaphorically, the lines would more accurately be gray and fuzzy. For example, a presentation component such as a display device can be an I/O component. Also, processors have memory. The inventors recognize that such is the nature of the art and reiterate that the diagram of FIG. 7 is merely illustrative of an exemplary computing device that can be used in connection with one or more embodiments of the present technology. Distinction is not made between such categories as "workstation," "server," "laptop," "handheld device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 712 includes computer storage media in the form of volatile and/or nonvolatile memory. As depicted, memory 712 includes instructions 724. Instructions 724, when executed by processor(s) 714 are configured to cause the computing device to perform any of the operations described herein, in reference to the above discussed figures, or to implement any program modules described herein. The memory can be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which can be built in. Illustrative components include a microphone, joystick, game pad, satellite dish, scanner, printer, wireless device, etc. I/O components 720 can provide a natural user interface (NUI) that processes air gestures, voice, or other physiological inputs generated by a user. In some instances, inputs can be transmitted to an appropriate network element for further processing. An NUI can implement any combination of speech recognition, touch and stylus recognition, facial recognition, biometric recognition, gesture recognition both on screen and adjacent to the screen, air gestures, head and eye tracking, and touch recognition associated with displays on computing device 700. Computing device 700 can be equipped with depth cameras, such as stereoscopic camera systems, infrared camera systems, RGB camera systems, and combinations of these, for gesture detection and recognition. Additionally, computing device 700 can be equipped with accelerometers or gyroscopes that enable detection of motion. The output of the accelerometers or gyroscopes can be provided to the display of computing device 700 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments can be practiced with only some of the described aspects. For purposes of explanation, specific numbers, materials, and configurations are set forth in order to provide a thorough understanding of the illustrative embodiments. However, it will be apparent to one skilled in the art that alternate embodiments can be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules can be merged, broken into further sub-parts, and/or omitted.

The phrase "in one embodiment" or "in an embodiment" is used repeatedly. The phrase generally does not refer to the same embodiment; however, it can. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A method comprising:
    obtaining a first dataset including a first set of nodes maintained in a hierarchical data structure;
    causing a portion of the first dataset to be displayed in a user interface;
    determining a subset of nodes of the first set of nodes displayed in the user interface;
    determining a set of urgency scores based on the subset of nodes, an urgency score of the set of urgency scores indicating a distance relative to an end of the first set of nodes; and
    based on at least one urgency score of the set of urgency scores being above a threshold, causing a request for a second dataset including a second set of nodes maintained in the hierarchical data structure to be generated.

2. The method of claim 1, wherein determining the subset of nodes of the first set of nodes displayed in the user interface further comprises obtaining an indication of the subset of nodes from a data structure associated with the user interface.

3. The method of claim 2, wherein determining the set of urgency scores further comprises obtaining the set of urgency scores assigned to the subset of nodes from the data structure.

4. The method of claim 3, wherein determining the set of urgency scores further comprises determining a depth associated with the subset of nodes.

5. The method of claim 1, wherein the method further comprises transmitting the request to a computing resource service provider.

6. The method of claim 1, wherein the threshold is determined based on a proximity from an end node of the first set of nodes.

7. The method of claim 6, wherein the proximity is a point between a first node of the first set of nodes and the end node.

8. A non-transitory computer-readable medium storing executable instructions embodied thereon, which, when executed by a processing device, cause the processing device to perform operations comprising:
- displaying a subset of nodes of a first set of nodes obtained from a data store, the data store including at least one other set of nodes, wherein the first set of nodes and the at least one other set of nodes are organized in a hierarchical data structure;
- generating a determination that a node of the subset of nodes is within a proximity to an end of the first set of nodes;
- based on the determination, determining a set of urgency scores associated with the subset of nodes, wherein nodes of the subset of nodes are assigned an urgency score based on a distance from the node; and
- based on at least one urgency score of the set of urgency scores being above a threshold, generating a request from a second set of nodes from the data store.

9. The medium of claim 8, wherein nodes of the first set of nodes further comprise folders and the hierarchical data structure further comprises a tree structure.

10. The medium of claim 8, wherein the subset of nodes of the first set of nodes are displayed in a user interface of an application.

11. The medium of claim 8, wherein the set of urgency scores are determined based on a depth value associated with the subset of nodes.

12. The medium of claim 8, wherein the data store is remote to the processing device and maintained by a computing resource service provider.

13. The medium of claim 8, wherein the first set of nodes are organized in a list; and
- wherein generating the determination further comprises determining the proximity to an end of the list.

14. The medium of claim 8, wherein the subset of nodes is at a first depth of the hierarchical data structure that is lower than at least one other depth of a second subset of nodes of the first set of nodes.

15. The medium of claim 14, wherein the threshold is modified based on the first depth.

16. A system comprising:
- a memory component; and
- a processing device coupled to the memory component, the processing device to perform operations comprising:
  - in response to a first request to obtain data from a data store, obtaining a first set of data objects of a plurality of data objects maintained in the data store in a hierarchical structure;
  - causing a subset of data objects of the first set of data objects to be displayed in a user interface of an application;
  - determining that a first data object of the subset of data objects is within a first distance to a second data object of the first set of data objects;
  - determining a set of urgency scores associated with the subset of data objects based on relatives distances of data objects to the second data object; and
  - based on at least one urgency score of the set of urgency scores exceeding a threshold, causing a second request to obtain data from the data store to be transmitted.

17. The system of claim 16, wherein the hierarchical structure further comprises a tree structure including at least a root level.

18. The system of claim 16, wherein the second data object is associated with an end of the first set of data objects.

19. The system of claim 16, wherein the processing device is further configured to perform the operations comprising modifying the threshold based at least in part on a depth associated with at least one data object of the subset of data objects.

20. The system of claim 16, wherein the second request is directed to a computing resource service provider that maintains the data store.

* * * * *